GUSHEE & DAWES.
Bee Hive.
No. 25,731.   Patented Oct. 11, 1859.
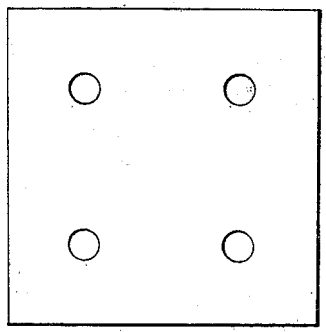
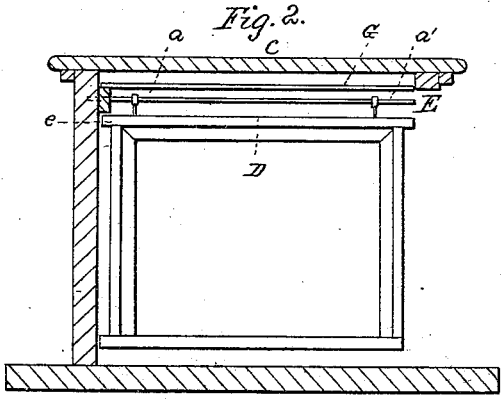
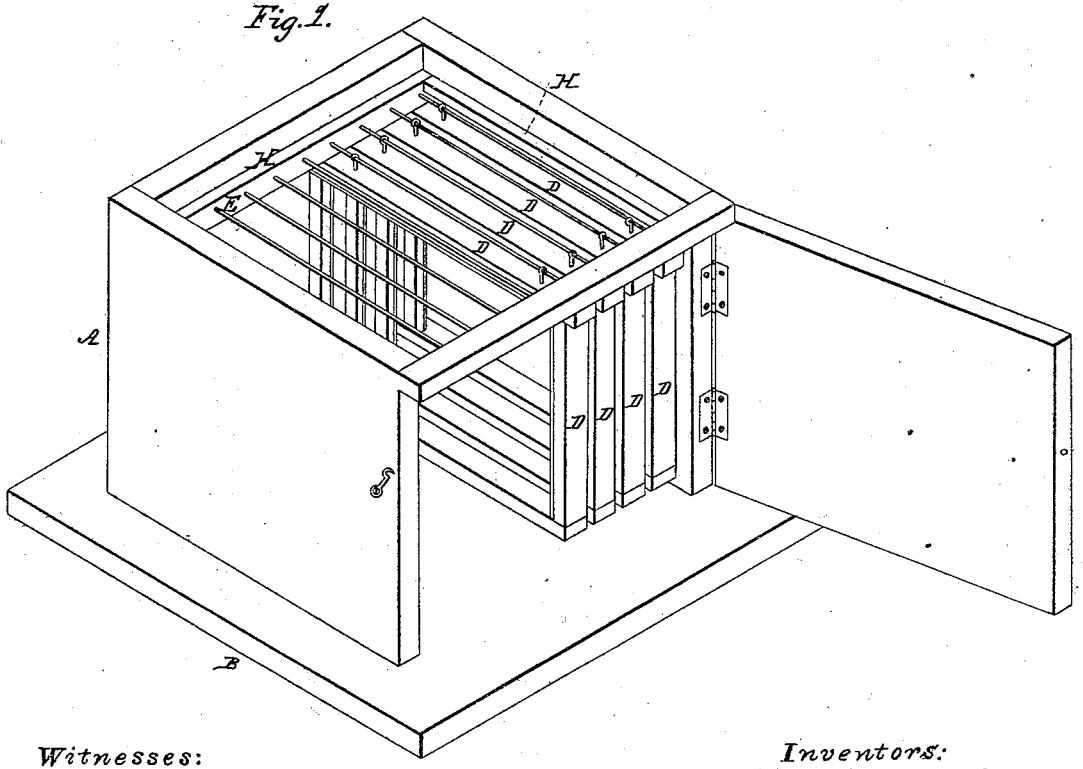
Witnesses:
F. G. Blankman
F. J. Thibault
Inventors:
Horace Gushee
John G. Dawes

UNITED STATES PATENT OFFICE.

HORACE GUSHEE AND JOHN G. DAWES, OF SAN FRANCISCO, CALIFORNIA.

BEEHIVE.

Specification of Letters Patent No. 25,731, dated October 11, 1859.

*To all whom it may concern:*

Be it known that we, HORACE GUSHEE and JOHN G. DAWES, both of the city and county of San Francisco and State of California, have invented a new and useful Improvement in Beehives, which we call "Gushee and Dawes Improved Bee-Hive;" and we do hereby declare that the following is a full, clear, and exact description of the construction and operation of the same, reference being had to the annexed drawings, making a part of this specification, in which—

Figure 1, is a perspective view of a beehive with the cover and a part of the comb-frames removed; Fig. 2, is a vertical section, and Fig. 3, represents a common honey-board.

A, is a hive of the simplest form, with a movable top and bottom represented by C, and B; D, D, are comb-frames; E, E, are rods upon which the comb-frames slide, being attached thereto by the staples $a$, $a'$.

When the comb-frames are in place the shoulder $e$, will be under and rest against the cleat H, and the heel $e'$, will press against the end of the hive. It will be readily perceived (Fig. 2) that the weight of the comb-frame will be supported by the wire E and staple $a$, (the staple $a'$, serving also as a guide) and by the pressure of the heel $e'$, against the end of the hive. The shoulder $e$, resting against the under part of the cleat H, effectually prevents any lateral motion of the comb-frame; the glass G, rests upon the cleats H, and is of great advantage in examining the making of the comb, as if it is discovered, by looking through the glass, that the bees are making a crooked comb, a cut off board may be inserted between the comb-frames, for the purpose of obliging them to straighten their work.

When it is desired to make extra honey, the cover of the hive and the glass should be removed (as seen in Fig. 1) and the common honey-board (Fig. 3) be placed upon the cleats H, to receive an extra hive with comb-frames or the common honey boxes.

We do not claim a hive with movable top and bottom, neither do we claim the comb-frame, nor the honey-board as they are in common use.

What we claim as an improvement in beehives, and desire to secure by Letters Patent is—

The combination of the comb-frames D, rods E, staples $a'$ $a$, and cleat H, arranged as described, whereby the comb-frames may be readily removed or inserted in the manner described and for the purpose specified.

HORACE GUSHEE.
JOHN G. DAWES.

Witnesses:
H. G. BLANKMAN,
F. J. THIBAULT.